July 4, 1967

H. B. RICE 3,329,257

CONVEYOR STRUCTURE

Filed Dec. 8, 1965

INVENTOR.
HAROLD B. RICE
BY Gordon Wood
ATTORNEY

July 4, 1967  H. B. RICE  3,329,257
CONVEYOR STRUCTURE
Filed Dec. 8, 1965  2 Sheets-Sheet 2

INVENTOR.
HAROLD B. RICE
BY Gordon Wood
ATTORNEY

United States Patent Office 3,329,257
Patented July 4, 1967

3,329,257
CONVEYOR STRUCTURE
Harold B. Rice, Walnut Creek, Calif., assignor to John Burton Machine Corporation, Concord, Calif.
Filed Dec. 8, 1965, Ser. No. 512,357
3 Claims. (Cl. 198—204)

This invention relates to conveyors and more particularly to the type conventionally known as "wheel conveyors" wherein articles to be moved along a path of travel are supported on a plurality of spaced apart wheels thereby reducing the force of friction impeding movement of the articles to be conveyed. More particularly the invention is concerned with a "live" conveyor wherein power is supplied to the conveyor for conveying articles up inclines as well as permitting movement of articles downwardly by gravity.

It is conventional procedure to convert a gravity roller conveyor or wheel conveyor to a live conveyor by supplying power to the rollers or wheels by means of belts, chains or the like. By the present invention, however, a conveyor in the nature of a drag chain conveyor is provided which may include wheels or rollers for supporting the articles to be conveyed and which at the same time obtains its power directly from a drag chain rather than through the wheels or rollers. By this general structure certain advantages obtain that are not found in conventional conveyors. For example, by engaging the article to be moved with the bare links of the chain a positive drive may be effected and at the same time permit rollers or wheels to carry a substantial portion of the weight of the articles to reduce the friction involved.

An important feature of the structure of the present invention is the fact that it lends itself readily to use as a gravity type conveyor which, by a simple conversion, may be converted into a live conveyor of the drag chain type.

One of the main objects of the present invention is the provision of a conveyor which is much more flexible in use than other conveyors presently available.

Another object of the invention is the provision of an improved drag chain conveyor having all of the advantages of conventional roller or wheel conveyors and which at the same time includes, with a minimum of expense, provision for direct engagement of a drag chain with the articles to be conveyed.

Still another object of the invention is the provision of a drag chain conveyor which employs the simplest and most economical type of chain available and which at the same time develops a minimum of frictional resistance thereby reducing the power required to operate the conveyor.

Other objects and advantages of the present invention will be apparent from the following specification and the drawings.

Figure 1:
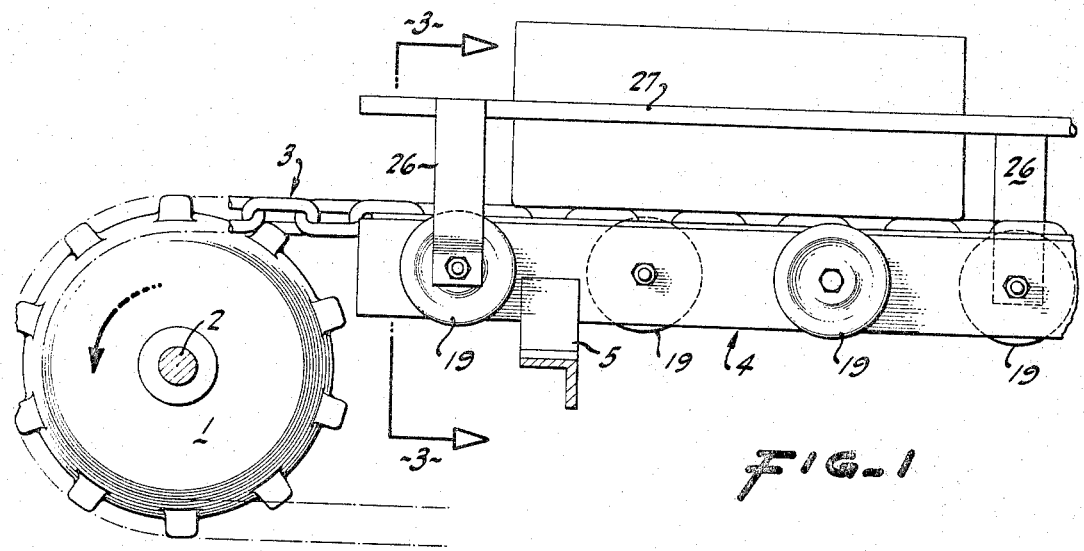
FIG. 1 is a fragmentary side elevation of the driving end of a conveyor incorporating the preferred form of the invention.
Figure 2:
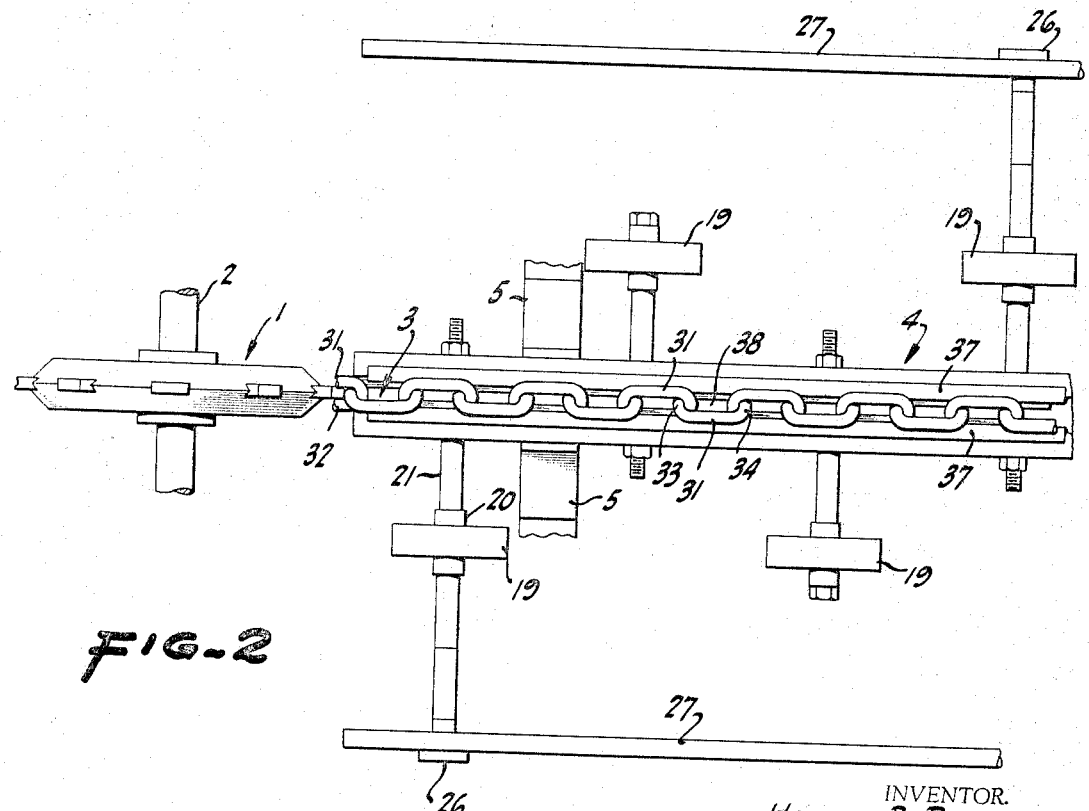
FIG. 2 is a top plan view of the structure of FIG. 1.
Figure 3:
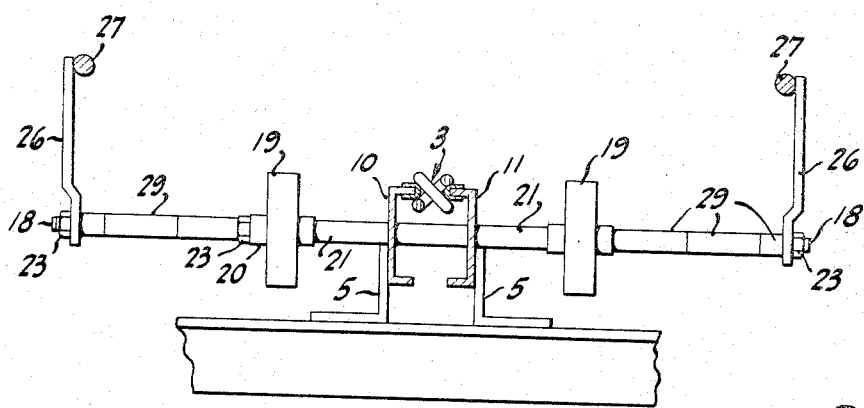
FIG. 3 is a vertical cross section through the conveyor taken in a plane indicated by lines 3—3 of FIG. 1.

In detail, and first with reference to FIGS. 1 and 2, the driving end of the conveyor includes a drive sprocket 1 supported on a drive shaft 2 and which shaft may be driven in any conventional manner. Sprocket 1 drives a conveyor chain generally designated 3, and it will be understood that an idler sprocket similar to the driving sprocket 1 is employed at the opposite end of the conveyor (not shown). The conveyor chain 3 is supported by a central frame structure generally designated 4 which extends longitudinally of the conveyor at the central plane thereof. Said frame structure may be suitably supported as desired by any convenient supports such as angle bar clips 5.

It will be understood that the particular path of travel of the conveyor is not important and it will be apparent that the same may include inclines, declines and arcuate portions to suit the particular path of travel along which the articles are to be conveyed.

The central frame structure 4 consists of a pair of opposed channel bars 10, 11 each of which includes a vertically extending web 12, a lower horizontally disposed flange 13 and an upper flange 14. At spaced points along the length of channel bars 10, 11 the same are provided with tubular spacers 16 and the webs 12 are formed with holes 17 for receiving therethrough a threaded rod 18 which passes through the holes 17 and the tubular spacer 16. Following conventional construction in wheel conveyors the rod 18 is preferably threaded throughout its length and extends laterally outwardly of the frame structure 4 to provide a support for wheels 19. Each of the wheels 19 is provided with a tubular bearing 20 through which the threaded rod 18 is passed. Between the bearing 20 and the adjacent frame structure 4 a tubular spacer 21 may be interposed and this structure may be repeated in the event it is desired to support more than one wheel 19 on each threaded rod 18. The parts may be tightened by means of nuts 23 to form a unitary structure.

At spaced points along the length of the conveyor upwardly extending standards 26 are provided which are secured at their upper ends to guide rods 27. The lower ends of standards 26 may be apertured for receiving threaded rods 18 therethrough and suitable additional spacers 29 may be provided on the threaded rods 18 between the standards 26 and the adjacent wheels 19 for the purpose of placing the guide rods 27 in the particular position required to restrain the article being conveyed to the predetermined path of travel.

The longitudinally extending slot 38 that is formed between the opposed edges of flanges 14 of the channel bars 10, 11 is adapted to receive therein the conveyor chain 3. Said conveyor chain is preferably of the conventional link type in which each link is formed from a cylindrical rod bent to provide a pair of parallel sides 31, 32 and a pair of opposite semicircular crowns 33, 34.

For the purpose of reducing friction to a minimum the free edges of upper flanges 14 of channel bars 10, 11 are provided with longitudinal extending wear strips 37 that are substantially U-shaped in cross section and which extend along the entire length of the conveyor. Said wear strips 37 are preferably made of an antifriction material such as nylon and may be adherently secured to the flanges 14, as best seen in FIG. 4.

Figure 4:
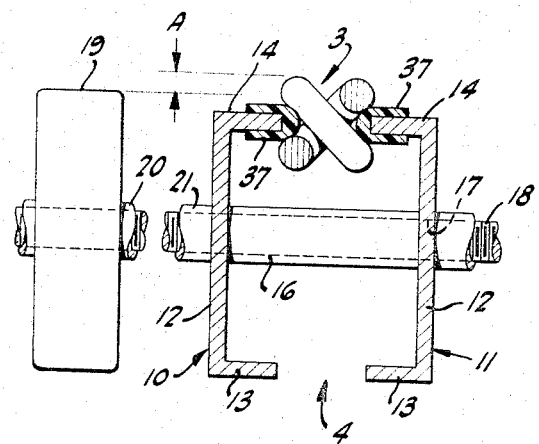
FIG. 4 is a fragmentary enlarged cross section similar to FIG. 3.

The spacing between the strips 37 is predetermined so that the chain 3 may be inserted in the slot 38 between strips 37 with the planes of the links slantingly disposed as best seen in FIG. 4. By this structure the crowns of each link prevent the adjacent links from swinging toward a vertical plane and thus prevent the chain from falling through the slot 38 even when the chain is in the relaxed condition shown in FIG. 5. When tension is applied to the chain, as when the conveyor is running, the effect of such tension is to dispose the planes of adjacent links at right angles to each other as shown in FIG. 4. In such a case the tension in the chain causes the links to ride upwardly slightly from a position of FIG. 5 to the position of FIG. 4 to more positively engage the bottom of the article being conveyed. As best seen in FIG. 4, the wheels 19 are positioned relative to the channel bars 10, 11 so that the top surfaces of the chain 3 are spaced a distance A above the upper peripheries of the wheels 19. In this manner a drag is applied to the article being conveyed but at the same time the presence of wheels 19 effectively reduces the resistance to movement of the articles being conveyed and lends stability to such articles.

Figure 5:
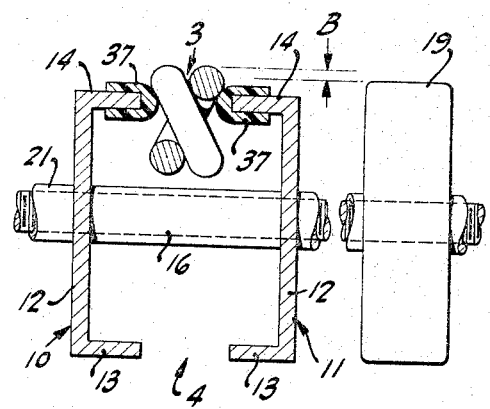
FIG. 5 is a view similar to FIG. 4 but showing the conveyor chain in a relaxed condition not under tension.

Since the position of the chain shown in FIG. 4 represents an upper position when the chain is under tension and the position of FIG. 5 represents a lower position when such tension is relaxed, it will be apparent that the weight of the articles being conveyed tends to move the chain downwardly from the position of FIG. 4 to the position of FIG. 5 thereby providing a yieldability which is desirable since the chain becomes self-adjusting and applies a dragging effect to the articles in proportion to the weight of the articles. In FIG. 5 the top surfaces of the chain 3 are a distance B above wheels 19.

It will be seen that the conveyor chain is extremely inexpensive as it is a staple article of commerce having numerous uses. Furthermore, conventional link chain of the type disclosed presents curved surfaces in all directions and especially smooth curved surfaces against the bottom of the articles being conveyed thereby minimizing damage to the articles in the event the load is blocked and the articles remain stationary as the conveyor continues to move under them.

Figure 6:
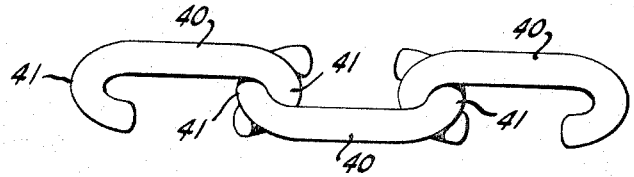
FIG. 6 is a fragmentary plan view of several links of a modified form of chain that may be employed in the present invention.

A modified form of chain is shown in FIG. 6 wherein each link comprises a longitudinally extending straight section 40 and a pair of opposite end crowns 41. By thus omitting one of the sides of the link or omitting a portion thereof certain advantages in assembly accrue. At the same time the weight of the chain is reduced as the essential upper side 40 is retained while the lower side that is not essential is omitted.

It as been found that the present invention lends itself readily to all kinds of installations including curves and turns which are performed easily by the chain in view of the very light friction involved in its operation. It will be apparent in this connection that more than one chain may be employed in those installations where relatively high loads are encountered.

One of the most important features of the present invention resides in the fact that the structure of the frame lends itself to use as a conventional gravity wheel conveyor when the chain 3 is omitted. In other words, by providing the longitudinally extending central structure 4 and eliminating any supporting structure adjacent the side edges of the conveyor the conveyor may be employed without the chain as a "free" conveyor and may readily be converted to a "live" conveyor simply by inserting the chain in the slot 38 and adding sprockets.

The return run of the conveyor is not disclosed because the same is not critical. Such return run may be supported on the lower flanges 13 of channel bars 10, 11 or in a tube supported on said flanges. Preferably, however, the return run is slidably received within a conduit extending in a straight line from the idler end of the conveyor to the driving sprocket 1.

The above specific description of the preferred form of the invention is not to be taken as restrictive as it will be apparent that various modifications in design may be resorted to by those skilled in the art without departing from the scope of the following claims.

I claim:
1. A wheel type conveyor comprising:
   a central longitudinally extending frame structure at the central plane of said conveyor,
   said structure including a first pair of coplanar guide elements fixedly secured together in spaced apart relation with the opposed edges of said elements spaced apart on opposite sides of said central plane to define a longitudinally extending first slot in the vertical central plane of said conveyor,
   an elongated tension member received in said first slot and slidable on said edges,
   a second pair of coplanar guide elements spaced downwardly from said first pair and defining a second slot for receiving the return run of said tension member therein,
   said structure including a pair of webs connecting corresponding guide elements of said pairs together,
   elongated wheel supports carried by said webs at spaced points along the length of said frame and extending outwardly of said frame to both sides of the latter for rotatably supporting wheels for carrying the weight of articles to be conveyed.

2. A conveyor according to claim 1 wherein said tension member is a plurality of serially connected chain links with alternate links slidably supported on one guide element and the links intermediate said alternate links slidably supported on the other guide element.

3. A conveyor according to claim 2 wherein antifriction wear strips are secured to said guide elements at said edges and in engagement with said chain links.

References Cited

UNITED STATES PATENTS

| 2,253,761 | 8/1941 | Campbell | 198—204 |
| 2,878,922 | 3/1959 | Bessette | 198—137 |
| 2,932,380 | 4/1960 | Alvey | 198—162 |
| 2,969,870 | 1/1961 | Pulver | 198—195 |
| 3,034,637 | 5/1962 | Swezey | 198—160 |

FOREIGN PATENTS

| 646,673 | 11/1928 | France. |
| 739,583 | 11/1955 | Great Britain. |

EVON C. BLUNK, *Primary Examiner.*

RICHARD E. AEGERTER, *Examiner.*